United States Patent

[11] 3,566,226

| [72] | Inventor | Emil S. Tamm |
| | | Fort Smith, Ark. |
| [21] | Appl. No. | 852,643 |
| [22] | Filed | Aug. 25, 1969 |
| [45] | Patented | Feb. 23, 1971 |
| [73] | Assignee | Baldor Electric Company |
| | | Fort Smith, Ark. |

[54] SINGLE-PHASE OPERATION OF THREE-PHASE MOTOR
2 Claims, 4 Drawing Figs.

| [52] | U.S. Cl. | 318/225 |
| [51] | Int. Cl. | H02p 7/00 |
| [50] | Field of Search | 318/216, 220, 221, 225, 226 |

References Cited
UNITED STATES PATENTS
2,203,927  6/1940  Rutherford............... 318/225
3,026,460  3/1962  Fath....................... 318/226
3,219,898  11/1965  Schaefer................. 318/225X

*Primary Examiner*—Oris L. Rader
*Assistant Examiner*—Gene Z. Rubinson
*Attorney*—John H. Sutherland ABSTRACT: Three-phase alternating current motor with Y-connected windings adapted to operate on single-phase source by disconnecting one leg of Y from other two legs, connecting the disconnected leg in series with a running capacitance across the single phase supply, connecting said two legs in series with a shuntable inductance across said supply. The coils of two voltage-sensitive relays for respectively shunting said shuntable inductance, and disconnecting a starting capacitance, each at different motor speeds, are connected in parallel with the aforesaid disconnected leg of the motor winding.

PATENTED FEB 23 1971       3,566,226

INVENTOR:
EMIL S. TAMM
BY John H. Sutherland
ATTORNEY.

SINGLE-PHASE OPERATION OF THREE-PHASE MOTOR

The invention relates to electric motors, and particularly to an arrangement for operating three-phase current motors from a single-phase source with smooth starting characteristics, low starting current and efficient running characteristics.

Various arrangements have been proposed for operating conventional three-phase motors from a single-phase source in emergency situations, or where three-phase power is unavailable at the site of motor operation. A special requirement for such machines is that the starting current be reduced to an unprecedented value for the horse power involved in order to avoid pulling down the line voltage when the motor is started. Otherwise, light flicker and operational failure of other machines may occur.

Accordingly, it is an object of the present invention to provide such an arrangement wherein the starting current supplied by a single-phase source may be readily reduced to the desired level without adversely affecting other operating characteristics, and wherein the phase shifting device and the current limiting device, both employed in starting, are so coordinated with the synchronous speed of the motor as to achieve maximum accelerating torque, prevent sharp increase in the voltage applied to electrolytic capacitors at higher speeds, and to thus eliminate the necessity for employing series-connected capacitors to reduce capacitor voltage, thereby reducing the cost and bulk of the capacitors, and to prevent a surge in current draw as the motor comes up to speed.

These and other objects of the invention are achieved by providing a conventional three-phase motor with three groups of stator windings of the usual Y-connected type, but electrically segregating one leg of such windings from the other two. Necessarily, the invention contemplates the provision, in such a stator winding, of 2 coils in each leg of the winding with a lead extending from each end of each individual coil for connection purposes into the motor conduit box so that the leads may be connected as desired to convert the motor from single-phase to three-phase, and vice versa, as well as to revise the arrangement of coils within legs of the windings and the interconnection thereof, to achieve such different operating conditions as single-phase with the coils of one leg connected in series with each other, and the coils of another leg connected in parallel with each other; or as three-phase with the coils in each leg in series with each other; or alternatively in parallel with each other.

An important feature of the invention is the provision of a current-limiting series impedance of the reactance type in series with one or more of the groups of stator windings for starting when the motor is energized from a single-phase source; and the provision of a phase-shifting agency of the capacitor type which is divided into a starting section and a running section, the former being connected in series with the disconnected winding leg across the poles of the single-phase source only during starting. The current limiting agency and the phase-shifting agency are energized immediately when the circuit is closed to the motor connected for operation from a single-phase source, and each is provided with an independent voltage-responsive means for operating it as the motor rotor speed increases, with concomitant reduction of starting current and increase in voltage across the respective voltage-responsive means. This aspect of the invention takes advantage of my discovery that optimum speed for shunting out the starting reactance is not the optimum speed for disconnecting the starting capacitors. Accordingly, each of the aforesaid voltage-responsive means is calibrated so that its function is performed for the optimum conditions controlled by it. For example, in one typical instance, the optimum speed for eliminating electrolytic capacitors from the starting circuit is approximately 75 per cent of synchronous speed. This provides the maximum accelerating torque (the cusp at switching speed being minimized), and also prevents the sharp increase in the voltage which would be impressed upon the electrolytic capacitors at higher speeds. On the other hand, the minimum speed for shunting out the starting reactance in the aforesaid typical instance is 90 percent of synchronous speed. At lower shunting speeds, a "spike" or surge in line current, that exceeds locked rotor current, exists just after shunting the reactance. This negates full use of the function of the starting reactance, and causes light flicker.

One embodiment of the invention is illustrated in the accompanying drawings, in which.

Figure 2:
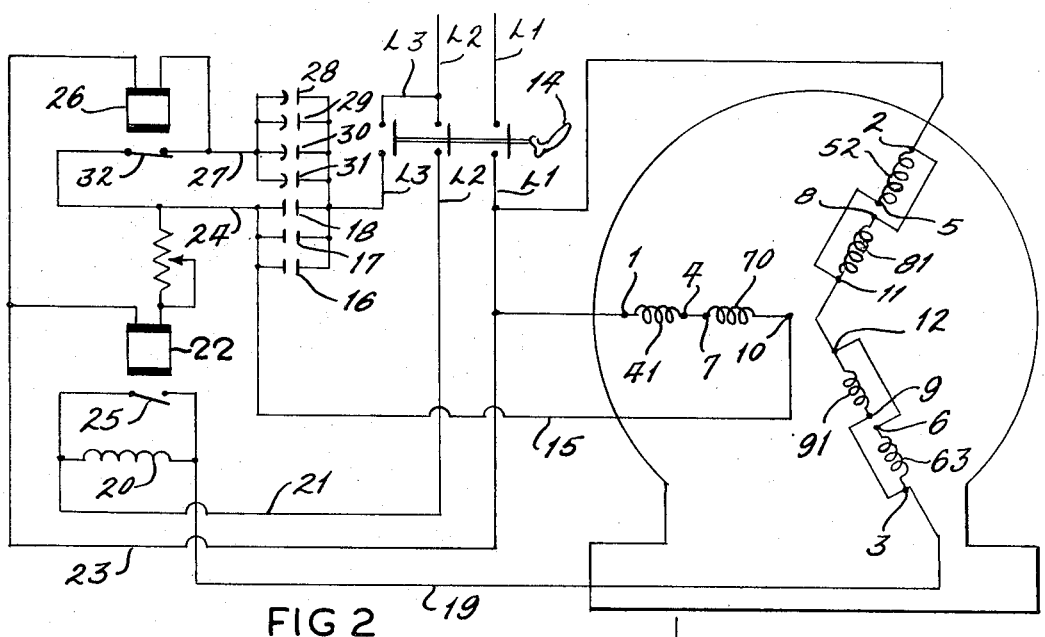
FIG. 2 is a wiring diagram showing the stator windings of FIG. 1 connected for single-phase operation, but under open circuit conditions.
Figures 3, 4:
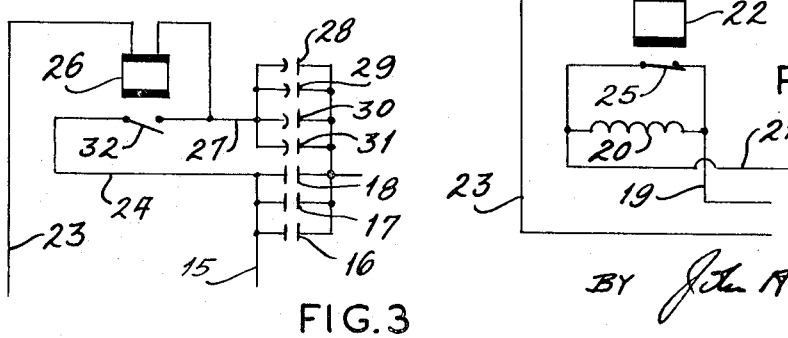

FIG. 3 is a view corresponding to a portion of FIG. 2, but showing the circuitry concerning the starting and running capacitors in the condition assumed after the rotor has reached the optimum speed for eliminating the starting capacitors from the circuit; and FIG. 4 is a view corresponding to a portion of FIG. 3, but showing the circuitry concerning the starting reactance or choke after the rotor has reached the optimum speed for eliminating the choke from the circuit.

Figure 1:
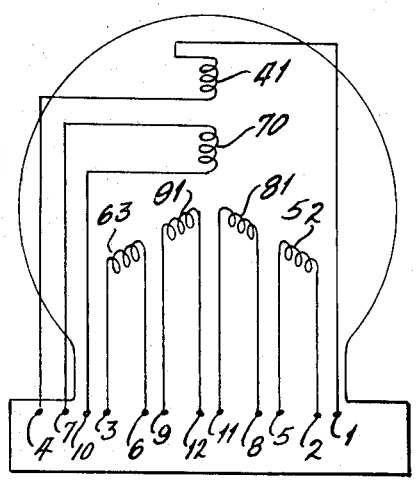
FIG. 1 is a diagrammatic view illustrating the stator windings of a motor adapted for use interchangeably between three-phase and single-phase, or otherwise as above stated.

As shown in FIG. 1, a typical three-phase motor has the winding in its respective legs (which may be Y-connected under three-phase operation) divided into two coil sections. The opposite ends of each coil section are provided with leads which extend into the motor conduit box. The leg of the Y-type winding, which is in the 12 o'clock position in FIG. 1, is composed of coils 41 and 70. One end of coil 41 is terminated in lead 1, and the other end thereof is terminated in lead 4. Likewise, one end of coil 70 goes to lead 7, and the other end thereof to lead 10. Similarly, the winding which is shown in the 4 o'clock position is composed of two coils 52 and 81. One end of coil 52 is connected to lead 2, while the other end thereof is connected to lead 5. One end of coil 81 is connected to lead 8, while the other end thereof is connected to lead 11. In like manner, the winding shown in the 8 o'clock position consists of coils 63 and 91. One end of coil 63 is connected to lead 3, while the other end thereof is connected to lead 6. One end of coil 91 is connected to lead 9, while the other end thereof is connected to lead 12. With this arrangement, the separate coils in a given winding leg can be connected in series or in parallel by the simple expedient of connecting the appropriate leads together on the outside of the motor. And in a comparable fashion, the respective coils of the several windings can be readily interchanged for operation under single-phase or three-phase supply.

In FIG. 2, a motor of the type shown in FIG. 1 is connected for energization by a single-phase source illustrated as having a three-pole control switch 14, shown in its open circuit position, but it will be understood by those skilled in the art that to energize line conductors L–1, L–2 and L–3, in the single phase operating condition illustrated, lines L–2 and L–3 are at the same polarity.

As shown in FIG. 2, the coils 41 and 70, which compose one winding, are shown as being connected in series with each other, as by the interconnection of leads 4 and 7. Lead 1 of coil 41 is connected to line 1, and lead 10 of coil 70 is connected through a conductor 15 in series with a bank of parallel oil capacitors 16, 17 and 18, which are the running capacitors, as distinguished from starting capacitors, for the system illustrated. The bank of capacitors 16—18 is, at t its other side, connected to line L–3.

The coils 52 and 81, which compose another winding group, are connected in parallel circuit relationship, with each other, by the interconnection of lead 2 with lead 8, and the interconnection of lead 5 with lead 11. As shown, the parallel winding pair 52–81 is connected in series with a corresponding parallel winding pair 63–91, which latter are connected in parallel circuit relationship with each other by connecting lead 12 with lead 6, and connecting lead 9 with lead 3. From lead 3, a conductor 19 extends to a choke coil 20, which constitutes a starting reactance, and the starting reactance, the choke 20, is connected through conductor 21 to line L-2. A voltage-sensitive relay 22 is connected for energization through conductor 23 to lead 1 of coil 41, and at the opposite side extends through suitable calibrating resistance, or the like, to a conductor 24 hence to conductor 15 to lead 10 of coil 70, and so is energized by the voltage generated in these series coils. The relay 22 is calibrated to close its contacts 25 so as to shunt choke 20 when the rotational speed of the motor has reached a value at which the starting reactance is no longer required. Such shunting of the starting reactance is accomplished when the voltage on the coil of relay 22 is sufficient to close the contact 25, thereby shunting coil 20.

A comparable, but differently calibrated, voltage-sensitive relay 26 has its coil connected between conductor 23 to lead 1 of coil 41, and conductor 27 through contacts 32 to conductor 24 to conductor 15 to lead 10 of coil 70, and so is energized by the voltage generated in these series coils as the motor rotor accelerates. When the speed of the motor has attained the value desired for eliminating the starting capacitors from the circuit, the voltage across the coil of relay 26 will increase so as to open its contacts 32, and disconnect the bank of starting capacitors. The latter establishes the running condition of the system on single-phase, with the bank of oil capacitors 16, 17 and 18 remaining permanently in the circuit between line L-1 via winding coils 41 and 70 to conductor 15, and line L-3, which latter is at the same potential as line L-2.

In like manner, but usually not until the motor rotor has attained a greater rotational speed than that at which relay 26 opened contacts 32, the voltage impressed upon relay coil 22 will have attained a value sufficient to move contact member 25 from the position shown in FIG. 2 to the position shown in FIG. 4. In the latter position, the choke coil 20 is shunted out, so that windings 52, 81, 63 and 91 are connected directly across line L-1 and L-2 without any intervening reactance, save, of course, that which is introduced by the winding coils themselves. Thus, the motor operates at running speed from a single-phase supply.

Since the motor is initially wound for operation with a three-phase supply, however, when such supply is available, the connections illustrated in FIG. 2 are readily converted to normal three-phase Y-connected windings by: bringing one leg of the three-phase circuit to lead 1 of FIG. 1; interconnecting leads 4 and 7; interconnecting leads 10, 11 and 12; interconnecting leads 6 and 9; connecting another lead from the three-phase source to lead 3; interconnecting leads 5 and 8; and connecting the lead from the third phase of the three-phase source to lead 2. In this arrangement, the motor winding is the common Y-connected system, with the coils in a given leg in series with each other. When it is desired that the coils in the legs of the Y be connected in parallel, however, the connections can be made as follows for three-phase energization: connect the three leads of of a three-phase source to leads 1, 2 and 3, respectively; interconnect leads 4 and 10; interconnect leads 7 and 1; interconnect leads 10, 11 and 12, interconnect leads 6 and 12; interconnect leads 3 and 9; interconnect leads 5 and 11; and interconnect leads 2 and 8.

From the foregoing description, those skilled in the art should understand that the invention accomplishes its objects, and provides a simple and efficient manner for converting a three-phase motor to operation from a single-phase source, and also for changing the relationship of the windings in such a motor so as to adapt the motor to differing demands in use.

While one complete embodiment of the invention has been disclosed in detail, it is not to be understood that the invention is limited to the specifics of the foregoing disclosure.

I claim:

1. In an electric motor having a rotor, a stator, three groups of stator windings, the windings of the different groups being disposed in 120° space position, and an array of leads each connected to one end of an individual one of said stator windings, each lead being optionally connectable to another lead to interconnect said windings according to one of:
 a. a three-phase operating system wherein an end of each group is connected to a different phase conductor of a three-phase source; and
 b. a single phase operating system wherein an end of one group is connected directly to one pole of a single-phase source and the other end connected through a permanently connected capacitance to the opposite pole of said single-phase source, an end of another group is connected through a selectively shuntable reactance to the opposite pole of said single-phase source, and an end of the third group is connected between the opposite end of said another group and said one pole;
 means for reducing the starting current when said windings are connected per (b) including a circuit having in shunt with the group connected to the capacitance:
 c. the coil of a relay for shunting said selectively shuntable reactance when said rotor has reached a predetermined speed; and
 d. the coil of a relay for disconnecting part of said capacitance when said rotor has reached a predetermined speed different from that in (c).

2. The motor of claim 1 wherein the relays referred to in (c) and (d) are each voltage-sensitive, and the relay of (c) is calibrated to actuate its contacts when the speed of the motor rotor has attained a value higher than that required to actuate the relay of (d).